United States Patent
Durrey et al.

(10) Patent No.: US 7,822,867 B2
(45) Date of Patent: Oct. 26, 2010

(54) METHOD OF SENDING DATA PACKETS FROM A SERVER TO A CLIENT, THE CLIENT SIMULTANEOUSLY USING AT A CONSTANT RATE D THE DATA THAT IT RECEIVES

(75) Inventors: Florent Durrey, Toulouse (FR); Frédéric Trinquecoste, Toulouse (FR)

(73) Assignee: Thales (FR)

( * ) Notice: Subject to any disclaimer, the term of this patent is extended or adjusted under 35 U.S.C. 154(b) by 230 days.

(21) Appl. No.: 11/969,841

(22) Filed: Jan. 4, 2008

(65) Prior Publication Data

US 2008/0183885 A1 Jul. 31, 2008

(30) Foreign Application Priority Data

Jan. 5, 2007 (FR) .................................. 07 00059

(51) Int. Cl.
*G06F 15/16* (2006.01)
*H04J 3/07* (2006.01)
*H04J 3/06* (2006.01)
(52) U.S. Cl. ....................... 709/231; 370/506; 370/510
(58) Field of Classification Search .................. 709/231; 370/506, 510
See application file for complete search history.

(56) References Cited

U.S. PATENT DOCUMENTS

| 6,169,821 | B1* | 1/2001 | Fukunaga et al. | 382/239 |
| 2003/0046032 | A1 | 3/2003 | Puthiyedath | |
| 2003/0067872 | A1* | 4/2003 | Harrell et al. | 370/229 |
| 2003/0120802 | A1* | 6/2003 | Kohno | 709/237 |
| 2005/0265383 | A1* | 12/2005 | Melpignano et al. | 370/465 |
| 2007/0079222 | A1* | 4/2007 | Kure et al. | 714/776 |

* cited by examiner

*Primary Examiner*—Ranodhi N Serrao
(74) *Attorney, Agent, or Firm*—Lowe Hauptman Ham & Berner, LLP

(57) ABSTRACT

A method is provided for sending data packets from a server to a client. A stream of data packets from the server to the client is composed of a main stream P, a retransmission stream R, and an advance stream A. P and A are fixed when R is zero. A is zero and the sum of P and R are fixed when R is not zero or when the client has accumulated data beyond a given threshold. A packet sent by the server but not received by the client is sent again to the client a given time after it was first sent. A packet sent by the server but not received by the client is sent again to the client only if the latter has already previously received a given number of packets sent by the server.

12 Claims, 3 Drawing Sheets

METHOD OF SENDING DATA PACKETS FROM A SERVER TO A CLIENT, THE CLIENT SIMULTANEOUSLY USING AT A CONSTANT RATE D THE DATA THAT IT RECEIVES

RELATED APPLICATIONS

The present application is based on, and claims priority from, French Application Number 07 00059, filed Jan. 5, 2007, the disclosure of which is hereby incorporated by reference herein in its entirety.

FIELD OF THE INVENTION

The present invention relates to a method of sending data packets from a server to a client. The client simultaneously uses, at a constant rate D, the data that it receives. The invention applies, for example, to the field of video on demand, where the client simultaneously displays the video data that it receives.

BACKGROUND OF THE INVENTION

New entertainment and communication services are today available to commercial or business airline passengers, these services being routinely combined under the designation "In-Flight Entertainment" (hereinafter called IFE). This can be, for example, high speed Internet access or even a video on demand service for each passenger. Thus, each passenger can, for example, choose to individually view any video content, such as a film. By an appropriate interface, each passenger can select what he wants to view. The film starts almost instantaneously, and it is not even necessary to wait for the film to download, which would represent a fairly long time. Subsequently, he can temporarily interrupt the viewing then resume it, or rewind to review a sequence, or even fast forward to skip sequences, once again with the same instantaneity as the start of the display. For the passenger, everything happens as if he were at home in front of a television connected to a video disc player.

This type of service is now available on board many airplanes. The current systems use in particular display modules at seatback level, input modules at armrest level, player and transmission modules at cabin head level, all these modules being interconnected by wired links. The IFE systems have consequently exploded the quantity of wiring for each seat, to the detriment of the configurability of the cabin.

Now, the configurability of the cabin is an important marketing factor for aircraft manufacturers, in particular the possibility for the customers to choose the number and the layout of the seats. In practice, given a few safety constraints, the airlines are relatively free as to the interior layout of the cabin when they order an airplane. This is so that they can adapt the cabin to the type of clientele on the line that they are expecting to operate. The IFE wiring of the seats has therefore become an increasingly weighty brake on the multipurpose nature of the aircraft. However, in the same way, a complete and efficient IFE system has also become a major marketing trump card for the aircraft manufacturers. The increased competition in the field of air transport and the democratization of airplane travel that has resulted therefrom, have made the IFE services, which could have seemed accessories in their beginnings, indispensable in winning market shares. It has therefore become appropriate to reconcile the technical constraints of the IFE systems with an optimum configurability of the cabin.

Thus, being aware of the growth of the wireless information transfer technologies, certain aircraft manufacturers have, in agreement with the airline operators and IFE system providers, quite simply eliminated certain IFE cables going to the seats, that are among the biggest hindrances to the configurability of the cabin. Only cables linking seats in small groups of two, three or four seats have been retained. It has become the responsibility of the IFE system providers to adapt, particularly by exploiting to the maximum the remaining wiring and making the best use of wireless technologies.

Developing a wireless communication protocol dedicated to video on demand in an IFE system would no doubt have led to a very efficient solution, but this would no doubt also have been very expensive. This is why the use of a communication standard has been preferred. Unfortunately, none of the current standards satisfies all the issues of video on demand in an IFE system. However, given in particular the maturity of the different technologies, the IEEE 802.11a, IEEE 802.11b, IEEE 802.11g or IEEE 802.11n standards, better known under the commercial designation of "WiFi links", appear the best suited. They have consequently been retained. In practice, the WiFi links give results that are quite satisfactory in consumer video applications, but applications without multiple broadcast constraint or display instantaneity constraint. Hereinafter, they will also be combined under the generic designation of 802.11.

In practice, on board a long haul airplane, several dozen or even several hundreds of passengers can simultaneously view different films, each passenger being able to interrupt, fast forward or rewind at will in the film that he is viewing. Consequently, each film viewed by a passenger constitutes a particular session, the corresponding video data stream having to be sent exclusively to the display screen of a single passenger. For example, an IFE system can broadcast 300 sessions simultaneously. Such a multiple broadcast constraint does not exist in any current consumer WiFi link video application. Similarly, the current video applications of the WiFi link do not provide almost instantaneous display, particularly on starting up the film. Waiting times of several seconds, sometimes masked by advertising or warning messages, are necessary before a play command can actually be executed. Thus, the applications that use a WiFi link in the home normally exploit the IEEE 802.11b and IEEE 802.11g standards, which provide three channels in the 2.4 gigahertz region for a total bit rate that can range up to 20 megabits per second (Mbps). A small number (a few units) of video streams can be sent simultaneously by each channel. This is not sufficient in the context of video on demand in an IFE system, for which the IEEE 802.11a standard seems better suited. The latter provides 23 channels between 5 and 6 gigahertz for a total bit rate that can range up to 600 Mbps. However, the IEEE 802.11a standard is even so not perfectly suited to the needs of video on demand in an IFE system.

In practice, the IEEE 802.11a standard does not guarantee that a packet will be received, or even guarantee that a packet will be received at a reasonable cost. Because the 802.11 standards are based on an acknowledgement mechanism: a message called ACK, an abbreviation of "ACKnowledgement", is sent to a sending WiFi device for each data packet received by a receiving WiFi device. The sending WiFi device sends the packet again to the receiving WiFi device until it receives the corresponding ACK message. After a certain number of re-sendings, the packet is no longer sent and it is definitively lost for the receiving WiFi device. By this mechanism, besides the fact that the bandwidth is used up in sending the ACK messages, it should be noted that, to recover a first lost packet, possibly many other packets can be lost subsequently! Thus, if the error rate is high, that is, if the number of packets lost compared to the number of packets sent is high, a delay can easily build up and errors can appear on the screen. The 802.11 standards respond to this by reducing the bit rate, which is not acceptable in the multiple video on demand context. An essential characteristic of the standard WiFi links is to provide an ongoing trade-off between the error rate and the bit rate. If the error rate increases, the bit rate reduces and vice-versa. It should, moreover, be noted that the data packets can be definitively lost and the data ultimately displayed can contain errors, which are manifested in most cases in black pixels or refresh failures. Some display terminals attempt to attenuate the visual discomfort that these residual errors can provoke, by image smoothing methods for example. Ensuring a constant rate for a WiFi link is one of the technical problems to which the invention proposes to provide a solution.

In the relatively cramped cabin of an airplane, even one the size of a long haul airplane, the errors are not due to the distance between the sending WiFi device and the receiving WiFi device. The problem comes from a conventional phenomenon known as "microfading": at very high frequency, the reception level can vary in time and in space. In the present case, the "microfading" is explained on the one hand by a phenomenon of resonance of the water molecules at the frequency used, the water being very present in the body of each of the many passengers in constant motion, and on the other hand by a phenomenon of wave reflection on metallic objects, metal being omnipresent in the cabin of an airplane.

The WiFi technology, initially designed to bring the Internet into the home, exchange emails and download files with no real time constraint, was not designed to be robust faced with the "microfading" phenomenon and provide a constant bit rate. Some more recent 802.11 standards provide for a quality of service in terms of latency, error rate and bit rate. However, they rely on a buffering mechanism of at least ten or so data seconds, which is incompatible with the almost instantaneous display demanded by video on demand in an IFE system, particularly on starting. The needs of video on demand in an IFE system do not therefore definitively tally with the development constraints of the WiFi technology. This is one of the reasons why multiple video on demand does not currently exist in a wireless IFE system. Today, a cabin head player module is still linked to the screens by an end-to-end wired link passing through the seats. The present invention proposes to resolve the problem of non-constant bit rate on a WiFi link in order to enable video on demand to be implemented in a wireless IFE system.

In closely related fields such as video on demand via an ADSL (Asymmetric Digital Subscriber Line) link, the problem of non-constant bit rate has been resolved by putting in place, at the network layer TCP/IP level, a buffering mechanism of a sufficiently long video stream duration. The volume of data contained in the buffer memory varies in proportion to the download rate. If the download rate is kept at a sufficiently high level for the buffer memory never to be emptied, then the continuity of the displayed video stream is assured. Otherwise, the image is frozen when the buffer memory is empty, it moves again only when the bit rate returns to a sufficient level for the buffer memory to be filled once again. One advantage of this solution is that the content of the buffer memory contains no error and the display is perfect with no correction of the display terminal. However, a major drawback of this solution is that the bit rate can vary and that the image can be frozen when the link is particularly bad.

SUMMARY OF THE INVENTION

An aim of the invention is to fix the bit rate of the WiFi link so that it no longer varies according to the error rate on the link. The invention makes it possible to limit both the downlink rate in the server-client direction and the uplink rate in the client-server direction. The invention is particularly effective when the nominal error rate on the link is less than $10^{-2}$. This is very often the case in practice, thanks in particular to the existing acknowledgement mechanisms implemented by the low-level OSI layers. Used in the context of a multiple-client application such as video on demand in an IFE system, it makes it possible in particular to prevent the reception-level degradations that a particular client can encounter having an impact on the other clients, that is, prevent the measures for recovering data lost by a client from slowing down the links of the other clients. To this end, the subject of the invention is a method of sending data packets from a server to a client, the client simultaneously using at a constant bit rate the data that it receives. A stream of data packets from the server to the client is composed of a main stream, a retransmission stream for sending again the packets that have not been received by the client and an advance stream for accumulating data at the client. The rate of the main stream is fixed at the constant rate at which the client uses the data. The rate of the advance stream is fixed at a given value when the rate of the retransmission stream is zero. The rate of the advance stream is zero and the sum of the rates of the main stream and of the retransmission stream is fixed at the constant rate at which the client uses the data when the rate of the retransmission stream is not zero or when the client has accumulated data beyond a given threshold. A packet sent by the server but not received by the client is sent again to the client a given time after it was first sent. A packet sent by the server but not received by the client is sent again to the client only if the latter has already previously received a given number of packets sent by the server.

Advantageously, the server can send data packets by said method to several clients at the same time.

For example, when the rate of the retransmission stream R is zero, the rate of the advance stream can be fixed at a percentage of the constant rate at which the client uses the data.

In one embodiment, the server can number the data packets that it sends to the client. The client can inform the server that, based on the numbering of the packets, packets are missing from the data packets that it has accumulated and for which the time allowed has elapsed since they should have been received. The client can also successively inform the server that packets are missing from the data packets that it has accumulated and for which successive times allowed have elapsed since they should have been received.

For example, the client can estimate the average time between the reception of two consecutive packets. By multiplying the difference between the number of the last packet received and the number of each accumulated packet by the average time, it can deduce the time elapsed since said packet was received.

Advantageously, the client can inform the server by sending to it a negative acknowledgement message. The message can indicate the numbers of missing packets and the server can send again to the client the packets whose numbers are indicated in the message.

In one embodiment, the client can increment a counter by a positive value r when it receives a packet from the server and send a negative acknowledgement message only if it can decrement the counter by a positive value greater than the increment value, as many times as there are missing packets and without the counter taking a negative value.

The client can send the data packets to the client via a WiFi link or any other link, wired or wireless, that is likely to lose packets, for example video data packets that the client simultaneously displays on a screen. Possibly, the video can be viewed by a passenger of an aircraft.

Other main advantages of the invention are that it has no impact on the lower level network layers that are the physical layer (PHY) and the link layer (MAC). Consequently, the invention is completely independent of the WiFi link proper, the 802.11 standards concerning only these two layers. Thus, if the wireless technology evolves, whether it is the WiFi technology or another technology that is used, the solution according to the invention remains effective without any modification. Obvious solutions at the PHY and MAC network layer levels invariably depend on the hardware and software, for example a WiFi card and its driver. They must therefore be modified when the standard evolves or the hardware changes. Such is not the case with the solution according to the invention which, in addition, requires only a small implementation effort compared to the PHY and MAC layer level solutions, which require an in-depth knowledge of the wireless standard used and of the hardware architecture. The solution according to the invention is therefore less expensive. Finally, since it is capable of delaying a retransmission, the solution according to the invention is able to wait for a better moment to retransmit the lost packets, whereas the low-layer level methods supply only means for retransmitting immediately.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWING

The present invention is illustrated by way of example, and not by limitation, in the figures of the accompanying drawings, wherein elements having the same reference numeral designations represent like elements throughout and wherein:

FIG. 1 uses an architecture diagram to illustrate one exemplary implementation of the invention, which can, for example, be implemented on board an airplane to supply video on demand in a wireless IFE system. A server module 3 includes in particular all the hardware needed to store and read video data, and to send it to an access point 4 via a wired link partly represented by a port 5. The access point 4 has, for example, a WiFi device 1 which wirelessly transfers the data to a WiFi device 2. A client module 6 includes all the hardware needed to receive video data, for example the WiFi device 2, and to display it using a screen that is not represented in FIG. 1. It will be understood that, in the example of FIG. 1, the server module 3 can address a set of modules identical to the client module 6. However, to help in understanding the invention, just one client module is represented in FIG. 1.

Figure 1:
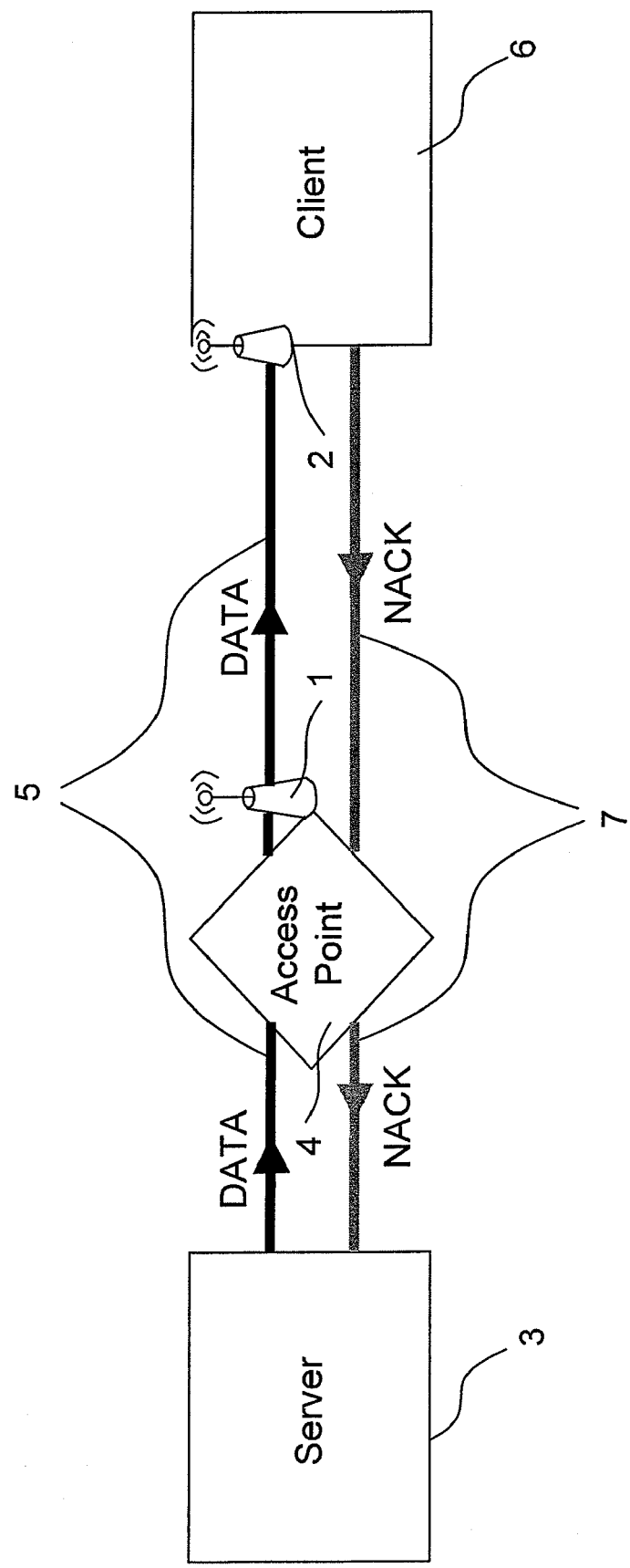
FIG. 1, an illustration in the form of an architecture diagram of an exemplary implementation of the invention.

The invention for example proposes to put in place a "Negative ACKnowledgement" (NACK) mechanism. This involves, for the module 6, sending an "NACK" message via a port 7 when it has not received a data packet. The "NACK" message is sent wirelessly by the WiFi device 2 to the WiFi device 1, the access point 4 transferring the message to the server module 3 via the wired link. In this example, the implementation used of the first five layers of the OSI model is as follows. The layer 1, or the physical layer (PHY), and the layer 2, or the link layer (MAC), implement the 802.11a standard. The layer 3, or network layer, implements the IP protocol. The layer 4, or transport layer, implements the UDP protocol. The layer 5, or session layer, implements the RTP protocol. Looking at layers 1 and 2, this implementation of the OSI model is well suited to the WiFi link illustrated in FIG. 1 by the WiFi device 1 and the WiFi device 2. For the module 6 to be able to detect that a packet has been sent by the module 3 but that it has not been received, the module 6 can advantageously consult, in each data packet, the header corresponding to the layer 5 implementing the RTP protocol. In practice, this RTP header contains in particular a sequence number inserted by the sending module 3, obtained by simple increment by 1 from one packet to the next. Advantageously, here too, based on this sequence number, it may be easy for the receiving module 6 to determine a packet number that it should have received but that it has not received, in which case it can, for example, return an "NACK" message to the sending module 3. The "NACK" message can contain the sequence number of the first lost packet and the sequence number of the first packet received after this first lost packet. For example, if the client module 6 initially receives packets numbered 11, 12, 13, 14, 18, 19 and 20, then it can send the message "NACK(15, 18)" to the port 7 and the server module 3 subsequently sends again the packets 15, 16 and 17 to the port 5.

In order to temporally decorrelate the re-sending of a packet from its initial failure to be sent, the invention moreover proposes that the module 6 should not immediately send the "NACK" message, but rather that it should wait for a certain time. In our case, the time begins on receipt of the packet number 18. In this way, if the reason for the loss of the packet was temporary, as is often the case with the "microfading" phenomenon described previously, then the second sending of the packet will have a much greater chance of being actually received than if the re-sending was done immediately after the first sending. It is preferable to choose a time for sending an "NACK" message that is relatively long in the context of an IT network, namely several seconds, in order to truly decorrelate the moment of the re-sending of the packet from the moment of the first sending, a moment at which the reception level was too low. Consequently, it is advisable to receive the data packets a few seconds before displaying them, in order to have the time needed to, if necessary, send an "NACK" message when a packet is missing and be able to receive the re-sending. Thus, since the film begins immediately a passenger starts viewing it, at the start he sees the images as they are received instantaneously by the WiFi device 2, with a nominal error rate $t_w$ corresponding to the nominal error rate of the basic WiFi link, without the delayed negative acknowledgement mechanism according to the invention. For example, $t_w$ can be $10^{-4}$ on average with peaks at $10^{-3}$. This means that, on average, for 10000 data packets sent by the sending module 3, one packet is not received by the receiving module 6, but this can rise to one packet not received for just 1000 packets sent. Then, when he advances in the film, the passenger sees the images as they have been received a few seconds ago by the WiFi device, with a corrected error rate $t_i$ corresponding to the error rate according to the invention, that is, including if necessary packets sent a second time thanks to the delayed negative acknowledgement mechanism according to the invention. For example, $t_i$ can be $10^{-6}$, that is, for 1000000 data packets sent by the sending module 3, one packet has not been received by the receiving module 6. It is important to note that one important aim of the delayed retransmission mechanism described previously is to temporally decorrelate the retransmission of a packet from the event causing the "microfading" and the initial loss of the packet.

It should also be noted that it is not a case of buffering proper since, initially on starting the film, there is no data retained in memory. It is more a question of an advance accumulation mechanism, described in detail hereinafter, obtained in particular by starting a session with a download rate greater than the playing rate. It should also be noted that, permanently, the screen included in the module 6 can, if necessary, attenuate the visual discomfort that the residual errors can provoke, by the use of image smoothing methods for example. Such methods do not in fact correct the errors, they simply make them less visible or less audible. They do, however, make it possible to achieve a visible or audible error rate $t_{a,v}$ such that $t_w > t_i > t_{a,v}$.

Figure 2:
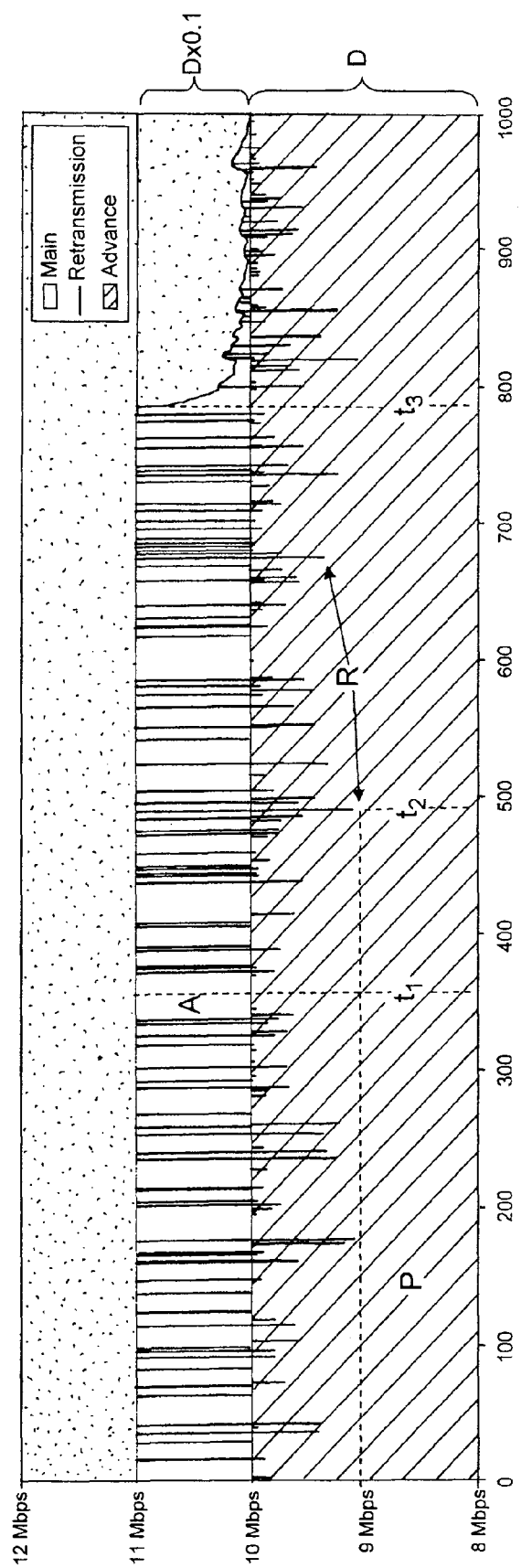
FIG. 2, an illustration in the form of a graph of an advance accumulation mechanism implemented in the example of FIG. 1.

FIG. 2 uses a graph to illustrate the advance accumulation mechanism implemented by the invention in the example of FIG. 1, in a system of axes where the x axis represents the duration of a session in seconds and the y axis represents the bit rate in Mbps on the link between the server 3 and the client 6. The server 3 sends data packets to the client 6 for 1000 seconds at a nominal rate D equal to 10 Mbps, which corresponds to the rate needed for the instantaneous display of the video data received. The corresponding data stream is broken down into two parts. A first part P constitutes a "Main" data stream. The stream P consists of video data packets sent for the first time in order to be displayed instantaneously. A second part R constitutes a "Retransmission" data stream. The stream R consists of video data packets sent for the second, third or nth time, normally with $n \geq 2$. The stream R corresponds to a rate equal to 0 in most cases, which will hereinafter be expressed in the form R=0. The stream R only occasionally takes non-zero values, when one or more packets are lost. A third stream A is a data stream corresponding to an accumulated "Advance". The stream A consists of video data packets sent for the first time in order to be displayed later. The advance stream A can, for example, have a bit rate equal to a maximum of 10% of the nominal bit rate D, which will be expressed in the form A=Dx0.1 hereinafter, that is A=1 Mbps. Thanks to the stream A, a rate of 10% above the nominal data rate D can be used by the server 3, in order to obtain an advance on the stream of data displayed instantaneously.

Permanently, P+R=D, that is, the main stream P and the retransmission stream R do not exceed the nominal rate D. When R≠0, that is, when data packets are lost and the client 6 sends "NACK" messages, the main stream P reduces in order to be able to send again data packets. This is what happens at a time $t_2$ corresponding to a little less than 500 session seconds, where P=9 Mbps and R=1 Mbps. It should be noted that A=0 at the time $t_2$. The server 3 then sends the data packets at a rate of D=10 Mbps.

In practice, the advance accumulation mechanism that the stream A represents is used only when there is no retransmission in progress, that is, when R=0 and P=D. In this case, the server 3 receives no "NACK" message from the client 6, so it therefore assumes that the quality of the link is sufficient to go a little faster and it increases the data packet sending rate. This is what happens at a time $t_1$ corresponding to a little more than 350 session seconds, where R=0 and P=D=10 Mbps and A=Dx0.1=1 Mbps. The server 3 then sends data packets at a rate of Dx1.1=11 Mbps, or 10% above the nominal rate D corresponding to the rate of display by the client 6, which therefore accumulates advance video data. The advance that the client 6 can obtain is, however, limited. In the example of FIGS. 1 and 2, the advance is limited to 60 display seconds. This explains why, from a time $t_3$ corresponding to a little less than 800 seconds or approximately 13 session minutes, the stream A breaks down and tends almost to a zero bit rate. It is important to note that an important aim of the present advance accumulation mechanism, based on three streams providing a rate between 100% and 110% of a fixed rate D, is to limit the downlink rate used to send packets to each of the many simultaneous clients, including the client 6. Thus, the degradation of the reception level on the link between the server 3 and the client 6 does not risk having negative impacts on the links between the server 3 and other clients. This is because, regardless of the number of retransmissions needed from the server 3 to the client 6, the total downlink rate from the server 3 to the client 6 cannot exceed 110% of D, even if it means not retransmitting lost packets.

Figure 3:
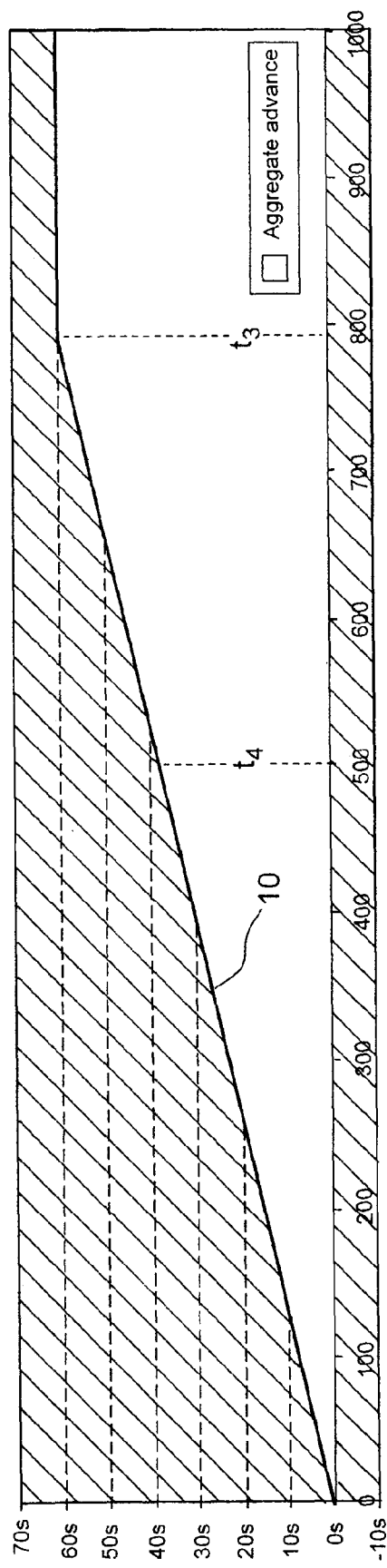
FIG. 3, an illustration in the form of a graph of the accumulated advance in the example of FIG. 1.

FIG. 3 uses a graph to illustrate the advance accumulation phenomenon in the exemplary implementation of the invention of FIG. 1, in a system of axes where the x axis represents the duration of the session in seconds and the y axis represents the aggregate advance duration in seconds. A curve 10 represents the trend of the aggregate advance, namely the integral of A in relation to time, that will hereinafter be denoted ∫A. At the start of the session, that is, at the time 0, the aggregate advance ∫A is zero. At a time $t_4$ corresponding to 500 session seconds, the aggregate advance ∫A is a little less than 40 seconds. At the time $t_3$ already illustrated by FIG. 2, that is, after approximately 13 session minutes, the aggregate advance ∫A reaches 60 seconds, which is the maximum advance value allowed in this exemplary implementation of the invention. Thus, from the time $t_3$, the aggregate advance ∫A no longer increases and remains constant at 60 seconds. This is explained by the fact that the stream A has a rate close to 0 from the time $t_3$. The server 3 then sends the data packets to the client 6 at the nominal rate D=P+R=10 Mbps. It should be noted that, even after the time $t_3$, the margin of 10% above the nominal bit rate D must be retained for the client 6, even if this margin is not used. In practice, at any moment, the reception quality can be degraded and lead to losses of data packets. The portion of the retransmission stream R then increases to the detriment of the portion of the main stream P, in which case the aggregate advance ∫A must start to be used, then subsequently built up again. The building-up again of the aggregate advance ∫A to bring it to the value of 60 seconds entails re-establishing the advance stream A at a rate close to 1 Mbps. It should also be noted that the optimum advance value allowed depends on numerous variables, such as the quantity of memory available on the client 6 side for storing video data. In the present exemplary implementation, the advance accumulation mechanism according to the invention makes it possible in any case for the client 6 to display video data that it has received 60 seconds previously and thus be able to delay the sending of an "NACK" message when a data packet is missing in the packets received.

The client 6 receives the data packets in the order in which they arrive at the WiFi device 2. Some received packets are packets sent for the first time. Other packets are retransmitted packets. Consequently, the client 6 must first re-order these packets according to their RTP sequence number. After a certain time, thanks to the advance accumulation mechanism described previously, the client 6 accumulates an ordered segment of advance video data. If necessary, this segment includes missing data that constitutes gaps. It can contain up to 60 seconds of video, but with gaps. In the present exemplary implementation of the invention, the client 6 for example implements a mechanism which, by analogy and to facilitate this explanation, will be denoted by the term "cleaner". A cleaner is a mechanism consisting in accessing, in order, the data of the segment, but a certain time after it has been received, in order to "clean up" the errors. It entails detecting the sequence numbers that are absent from the segment, that is, the gaps, in order to send an "NACK" message for these missing sequence numbers. Each cleaner is characterized by a delay time ΔT relative to the received data stream. For example, a first cleaner can access, in the segment, the data that has been received 2 seconds previously. A second cleaner can access, in the segment, the data that has been received 20 seconds previously. A third cleaner can access, in the segment, the data that has been received 40 seconds previously. The number of cleaners and their respective delay times ($\Delta T_i$) can vary. Thus, the sending of an "NACK" message by the client 6 is offset by 2, 20 or 40 seconds relative to the corresponding sending by the server 3. It is important to note that it is the cleaners that make it possible to delay the retransmissions according to the invention.

The cleaners can maintain their delay time relative to the received data stream by various means. For example, a function can calculate every second the average time interval between the packets received during the last second. This average time will hereinafter be called "inter-packet interval". If no packet has been received in the last second, or if the last inter-packet interval calculated is greater than the preceding one, which means that fewer packets have been received in the last second that has elapsed than in the preceding one, then it is the last calculated value of the inter-packet interval that is retained.

Thanks to the inter-packet interval, each cleaner can, for example, dynamically calculate by how many packets it should remain behind the received data stream. For example, if the current value of the inter-packet interval is 1 millisecond, the 2-second cleaner must remain 2000 packets behind the received data stream. If the last packet received by the client 6 is numbered 200 000 and the cleaner is at the packet 199 000, then the cleaner knows that it has one second of advance and waits one second in order to maintain precisely 2 seconds of advance on the received data stream. When the received data stream ends, because the server 3 has finished sending the video file for example, the cleaner will continue and check the latest data received. This is a way of ensuring that there are no remaining errors at the end of the film.

The client 6 is also limited as to the number of retransmission requests. This can be done, for example, using a retransmission credit mechanism implemented by a counter. A retransmission credit is a positive integer value having a maximum value equal to 100000 for example. The client 6 can, for example, increment the counter by 1 each time a packet is received. To be able to send an "NACK" message when a missing packet is detected by a cleaner, the client 6 needs to be able to decrement its counter by 100 for example, knowing that the counter cannot be negative. In the exemplary message "NACK(15, 18)" given previously, the client 6 needs to be able to decrement its counter by 300. This limits the error rate that can be recovered by the invention to approximately $10^{-2}$ and limits to a maximum of 1000 subsequent retransmissions for the client 6. It is important to note that an important aim of the retransmission credit mechanism described previously is to limit the uplink rate used for each of the numerous simultaneous clients, including the client 6, for sending "NACK" messages to the server 3. Thus, the degradation of the reception level on the link between the server 3 and the client 6 does not risk having negative impacts on the links between the server 3 and other clients. This is because, regardless of the number of retransmissions needed, the total uplink rate from the client 6 to the server 3 for sending "NACK" messages is limited, even if it means not being able to obtain the retransmission of lost packets.

Despite the delayed retransmissions, the video stream can be displayed to the passenger without delay, or almost without delay. In practice, if, for example, an imperceptible delay of only 3 seconds is allowed between the moment when the passenger presses the play button and the moment when the video is actually displayed on the screen, this is sufficient to make the invention effective from the start of the session. It should be noted that such a delay of 3 seconds is almost imperceptible to the passenger and it is much less than the time needed to download a video on the Internet. During these first 3 seconds, the video data can be downloaded without being displayed. The display can begin when the data segment contains 3 seconds of video. At this moment, the first 2-second cleaner has already been able to request any packets lost in the first download second. Therefore, the first second of video displayed has been corrected by retransmissions according to the invention. The first cleaner normally corrects most of the errors. If the nominal error rate $t_w$, that is, the rate before retransmission according to the invention, is less than $10^{-3}$, then approximately 99% of the errors are corrected by the first 2-second cleaner. With reference to the error rate $t_i$ corrected according to the invention, the error rates corrected by retransmission thanks to the 2-second cleaner, thanks to the 20-second cleaner and thanks to the 40-second cleaner will respectively be denoted $t_i^2$, $t_i^{20}$, and $t_i^{40}$ hereinafter. Thus, in the first second, the rate $t_i^2$ is less than $10^{-5}$. A very good video quality can therefore be obtained from the start, even if the link quality is poor. It should be noted that the 20- and 40-second cleaners are not yet active when the display begins. They will be operative only once the segment has been sufficiently filled, that is, when it contains at least 21 seconds of video for the 20-second cleaner and at least 41 seconds of video for the 40-second cleaner. Now, according to the graph of FIG. 3, it takes approximately 4 minutes to accumulate 20 seconds of advance and 8 minutes to accumulate 40 seconds of advance. Furthermore, trial measurements have shown that each of the second and third cleaners makes it possible to divide the error rate by a factor of 10. This means that, even in a worst case where the nominal error rate $t_w$ is equal to $10^{-3}$ before any retransmission according to the invention, the displayed video stream has an error rate $t_i$ corrected according to the invention that is better than $10^{-5}$ in the first 4 minutes, better than $10^{-6}$ between the 4th and 8th minutes and better than $10^{-7}$ after the 8th minute. Obviously, the delays assigned to the cleaners can be changed if they are considered too long relative to all the video data to be displayed. However, it should be noted that the more cleaners there are implemented, the more the size of the segment increases and the more the memory space needed with the client 6 increases as well. Finally, the advance accumulation and delayed retransmission mechanisms described previously are effective assuming that no rewind command to review a sequence or even fast forward command to skip sequences is entered by the passenger. If the passenger uses such commands, other complementary techniques for using the existing segment must be implemented, in order in particular to prevent the segment from starting up again blank when normal playing resumes. However, this is a departure from the context of the present explanation.

The exemplary implementation of the invention illustrated by FIGS. 1, 2 and 3 implements an 802.11 standard by way of example only. In practice, it is important to understand that the invention is completely independent of the WiFi link. The invention can be implemented on other link types, wired or wireless, and for types of application other than video applications.

The invention described previously also has the main advantages that if the error rate is less than $10^{-3}$ at the start, then it can be guaranteed that, subsequently, it will fall below $10^{-6}$, that is, a virtually error-free video stream which can therefore easily be corrected by the display module.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalent thereof.

The invention claimed is:

1. A method of sending a stream of data packets from a server to a client, the client simultaneously using, at a constant bit rate D, the data that it receives, comprising the steps of:
   determining that a packet sent by the server has not been received by the client,
   sending the packet by the server that has not been received by the client again to the client at a given time $\Delta T$ after it was first sent, the time $\Delta T$ satisfying $\Delta T \times D < S$; and
   wherein the packet sent by the server but not received by the client is sent again to the client only if the latter has already previously received a given number of packets sent by the server,
   wherein the stream of data packets from the server to the client is composed of a main stream P, a retransmission stream R for sending again the packets that have not been received by the client and an advance stream A for accumulating the data at the client, the rate of the main stream P being fixed at D and the rate of the advance stream A being fixed at a given value when the rate of the retransmission stream R is zero, the rate of the advance stream A being zero and the sum of the rates of the main stream P and of the retransmission stream R being fixed at the rate D when the rate of the retransmission stream R is not zero or when the client has accumulated data beyond a given threshold S.

2. The method as claimed in claim 1, wherein the server sends data packets by said method to several clients at the same time.

3. The method as claimed in claim 1, wherein, when the rate of the retransmission stream R is zero, the rate of the advance stream A is fixed at p×D, where p is a real number such that 0<p<1.

4. The method as claimed in claim 1, wherein the server numbers the data packets that it sends to the client, the client informing the server that, on the basis of the numbering of the packets, packets are missing from the data packets that it has accumulated and for which the time $\Delta T$ has elapsed since they should have been received.

5. The method as claimed in claim 4, wherein the client estimates the average time between the reception of two consecutive packets, the difference between the number of the last packet received and the number of each accumulated packet being multiplied by the average time in order to deduce the time that has elapsed since said packet was received.

6. The method as claimed in claim 4, wherein the client informs the server by sending to it a negative acknowledgement message (NACK), the message indicating numbers of missing packets, the server sending again to the client the packets whose numbers are indicated in the message.

7. The method as claimed in claim 6, wherein the client increments a counter by a positive value r when it receives a packet from the server and it sends a negative acknowledgement message indicating to the server numbers of missing packets only if it can decrement the counter by a positive value m, where m>r, as many times as there are missing packets and without the counter taking a negative value.

8. The method as claimed in claim 1, wherein the client successively informs the server that packets are missing from the data packets that it has accumulated and for which successive times ($\Delta T_i$), i belonging to $\{1, \ldots n\}$, have elapsed since they should have been received, $\Delta T_i$ satisfying $\Delta T_i \times D < S$ for any i belonging to $\{1, \ldots n\}$.

9. The method as claimed in claim 8, wherein the client estimates the average time between the reception of two consecutive packets, the difference between the number of the last packet received and the number of each accumulated packet being multiplied by the average time in order to deduce the time that has elapsed since said packet was received.

10. The method as claimed in claim 1, wherein the client sends the data packets to the client via a link compliant with the 802.11 standard or any other link, wired or wireless, that is likely to lose packets.

11. The method as claimed in claim 1, wherein the data is video data, the client displaying on a screen the video data that it receives simultaneously from the server.

12. The method as claimed in claim 11, wherein the video data displayed on the screen is viewable by a passenger of an aircraft.

* * * * *